(12) United States Patent
Yamada (10) Patent No.: US 7,699,326 B2
(45) Date of Patent: Apr. 20, 2010

(54) IN-WHEEL SUSPENSION (75) Inventor: Masahiko Yamada, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 356 days.

(21) Appl. No.: 11/813,961

(22) PCT Filed: Aug. 7, 2006

(86) PCT No.: PCT/IB2006/002159
§ 371 (c)(1),
(2), (4) Date: Jul. 13, 2007

(87) PCT Pub. No.: WO2007/026198
PCT Pub. Date: Mar. 8, 2007

(65) Prior Publication Data
US 2008/0203693 A1 Aug. 28, 2008

(30) Foreign Application Priority Data
Aug. 30, 2005 (JP) ............... 2005-249401

(51) Int. Cl.
B60G 7/02 (2006.01)

(52) U.S. Cl. .............. 280/86.75; 280/124.125; 280/93.51

(58) Field of Classification Search ........ 280/124.1, 280/124.11, 124.125, 124.126, 124.127, 280/124.13, 124.134, 124.135, 124.136, 280/124.15, 86.75, 86.758, 93.512, 91.51, 280/124.153; 180/65.5
See application file for complete search history.

(56) References Cited

U.S. PATENT DOCUMENTS

| 4,530,513 A | | 7/1985 | Kijima et al. | |
| 4,542,920 A | | 9/1985 | Kijima et al. | |
| 4,603,882 A | | 8/1986 | Kijima et al. | |
| 4,930,805 A | * | 6/1990 | Takata et al. | 280/124.128 |
| 5,205,580 A | * | 4/1993 | Luger et al. | 280/86.75 |
| 5,405,162 A | * | 4/1995 | Chun | 280/124.143 |
| 5,499,839 A | * | 3/1996 | Wahl et al. | 280/124.145 |

(Continued)

FOREIGN PATENT DOCUMENTS

CN     1204593 A     1/1999

(Continued)

Primary Examiner—Paul N Dickson
Assistant Examiner—Jordan Golomb
(74) Attorney, Agent, or Firm—Oblon, Spivak, McClelland, Maier & Neustadt, L.L.P.

(57) ABSTRACT

An in-wheel suspension including a vehicle body-side member (90). The vehicle body-side member (90) is coupled with a vehicle body at least two coupling portions (92a, 92b, 92c), one of which is positioned above a wheel center and the other of which is positioned below the wheel center, via respective elastic members (96a, 96b, 96c). The elastic member (96b) arranged at the upper coupling portion (92b) has portions with high rigidity, and portions with low rigidity formed in an oblique direction that extends upward and toward an inside of a vehicle from a position outside of the vehicle. The elastic member (96a, 96c) arranged at the lower coupling portion (92a, 92c) has portions with high rigidity, and portions with low rigidity formed in an oblique direction that extends downward and toward the inside of the vehicle from a position outside of the vehicle.

3 Claims, 9 Drawing Sheets

U.S. PATENT DOCUMENTS

| | | | |
|---|---|---|---|
| 5,511,817 A * | 4/1996 | Kasahara et al. | 280/124.138 |
| 5,685,556 A | 11/1997 | Shibue et al. | |
| 6,116,627 A * | 9/2000 | Kawabe et al. | 280/124.15 |
| 6,170,838 B1 * | 1/2001 | Laurent et al. | 280/5.508 |
| 6,254,114 B1 * | 7/2001 | Pulling et al. | 280/93.511 |
| 6,357,770 B1 * | 3/2002 | Carpiaux et al. | 280/124.127 |
| 6,406,036 B1 * | 6/2002 | Laurent et al. | 280/5.509 |
| 6,412,797 B1 * | 7/2002 | Park | 280/124.125 |
| 6,962,355 B2 * | 11/2005 | Kwon | 280/86.75 |
| 6,962,356 B2 * | 11/2005 | Kwon | 280/86.75 |
| 7,168,719 B2 * | 1/2007 | Gerrard | 280/124.135 |
| 7,185,903 B2 * | 3/2007 | Dove | 280/124.141 |
| 7,243,749 B2 * | 7/2007 | Kakinami et al. | 180/65.51 |
| 7,287,611 B2 * | 10/2007 | Nagaya | 180/65.51 |
| 7,364,176 B2 * | 4/2008 | Saitoh et al. | 280/124.13 |
| 7,389,999 B2 * | 6/2008 | Kimura et al. | 280/93.512 |
| 7,398,982 B2 * | 7/2008 | Hozumi | 280/93.512 |
| 7,427,072 B2 * | 9/2008 | Brown | 280/5.5 |
| 7,434,823 B2 * | 10/2008 | Robinson | 280/124.153 |
| 2003/0107201 A1 * | 6/2003 | Chun | 280/124.135 |
| 2005/0200094 A1 * | 9/2005 | Hozumi | 280/124.135 |
| 2005/0275813 A1 * | 12/2005 | Yamazaki | 353/94 |
| 2008/0100021 A1 * | 5/2008 | Yamada | 280/124.127 |

FOREIGN PATENT DOCUMENTS

| | | |
|---|---|---|
| DE | 1 077 538 | 3/1960 |
| DE | 2 311 480 | 9/1974 |
| DE | 295 19 108 | 4/1997 |
| JP | 4 287708 | 10/1992 |
| JP | 6-64421 | 3/1994 |
| JP | 10-47433 | 2/1998 |
| JP | 10 338009 | 12/1998 |
| JP | 2000 25438 | 1/2000 |
| JP | 2000 233619 | 8/2000 |
| JP | 2007062498 * | 3/2007 |

* cited by examiner

IN-WHEEL SUSPENSION

FIELD OF THE INVENTION

The invention relates to an in-wheel suspension where main portions of suspension components are arranged in a wheel.

BACKGROUND OF THE INVENTION

Such an in-wheel suspension is described, for example, in Japanese Patent Application Publication No. JP-A-10-338009. The in-wheel suspension described in this publication includes a hub that supports a wheel. The wheel mainly includes a disc and a rim. The rim has a reference width and a reference diameter. The in-wheel suspension includes a wheel carrier that defines the rotational axis of the hub, and a guide member that guides the movement of the wheel carrier with respect to a support member in the axial direction. The support member includes fitting means for fitting the support member to a chassis of a vehicle. The wheel carrier is fitted to the guide member by a long-and-thin single bar, and slides according to the guidance by the guide member. The wheel carrier is prevented from rotating on the sliding axis. The wheel carrier is fitted to the both ends of the bar. The in-wheel suspension includes means for supporting a load of the vehicle transmitted to the wheel carrier by the support member. The wheel carrier, the bar, and the guide member are housed in the wheel along the diameter defined by the reference diameter. The wheel carrier, the bar, and the guide member are housed in a limited space having a shape of a cylinder where one of the surfaces of the cylinder, which extend in the axial direction of the wheel carrier, bar, and the guide member, is defined by the disc of the wheel and the other surface is defined by a virtual surface contacting the rim.

In such an in-wheel suspension including a sliding mechanism, however, degrees of freedom in movements of a tire/wheel assembly other than the vertical/substantially vertical movement and the rotational movement are actually restricted by the sliding mechanism. This makes it difficult to change the camber angle when the tire/wheel assembly moves in the vertical/substantially vertical direction (when the tire/wheel assembly jounces/rebounds), and to change the orientation of the tire/wheel assembly such that the toe-in-angle increases when a braking force is applied. Such inconvenience does not occur, for example, in a commonly used multi-link suspension without a sliding mechanism.

DISCLOSURE OF THE INVENTION

A first object of the invention is to provide an in-wheel suspension including a sliding mechanism, with which a camber angle can be changed in the optimum manner when a tire/wheel assembly jounces/rebounds.

A second object of the invention is to provide an in-wheel suspension including a sliding mechanism, with which a toe angle can be changed in the optimum manner when a braking force is applied.

A first aspect of the invention relates to an in-wheel suspension including a tire/wheel assembly support member that supports a tire/wheel assembly; a vehicle body-side member that supports the tire/wheel assembly support member via a sliding mechanism such that the tire/wheel assembly support member can move in the vertical/substantially vertical direction; and at least one of a spring element and an attenuation element that is arranged between the tire/wheel assembly support member and the vehicle body-side member. The vehicle body-side member of the in-wheel suspension is coupled with a vehicle body at least two coupling portions, one of which is positioned above a wheel center and the other of which is positioned below the wheel center, via respective elastic members, and at least one of a structure (a) and a structure (b) is provided. (a) The elastic member arranged at the upper coupling portion has portions with high rigidity, and portions with low rigidity formed in an oblique direction that extends upward and toward an inside of a vehicle from a position outside of the vehicle. (b) The elastic member arranged at the lower coupling portion has portions with high rigidity, and portions with low rigidity formed in an oblique direction that extends downward and toward the inside of the vehicle from a position outside of the vehicle.

In the first aspect, the elastic member arranged at the upper coupling portion may be a bushing, and the portions with low rigidity may be formed in a direction in which the axis of the bushing extends. The elastic member arranged at the lower coupling portion may be a bushing, and the portions with low rigidity may be formed in a direction in which the axis of the bushing extends.

A second aspect of the invention relates to an in-wheel suspension including a tire/wheel assembly support member that supports a tire/wheel assembly; a vehicle body-side member that supports the tire/wheel assembly support member via a sliding mechanism such that the tire/wheel assembly support member can move in the vertical/substantially vertical direction; and at least one of a spring element and an attenuation element that is arranged between the tire/wheel assembly support member and the vehicle body-side member. The vehicle body-side member is coupled with a vehicle body at least two coupling portions, one of which is arranged on the front side of a wheel center and the other of which is arranged on the rear side of the wheel center, via respective elastic members, at least one of a structure (a) and a structure (b) is provided. (a) The elastic member arranged at the front coupling portion has portions with high rigidity, and portions with low rigidity formed in an oblique direction that extends rearward and toward an inside of the vehicle from a position outside of the vehicle. (b) The elastic member arranged at the rear coupling portion has portions with high rigidity, and portions with low rigidity formed in an oblique direction that extends forward and toward the inside of the vehicle from a position outside of the vehicle.

In the second aspect, the elastic member arranged at the front coupling portion may be a bushing, and the portions with low rigidity may be formed in a direction in which the axis of the bushing extends. The elastic member arranged at the rear coupling portion may be a bushing, and the portions with low rigidity may be formed in a direction in which the axis of the bushing extends.

In the second aspect, the front bushing may be more rigid than the rear bushing.

A modified example of the second aspect relates to an in-wheel suspension including a tire/wheel assembly support member that supports a tire/wheel assembly; a vehicle body-side member that supports the tire/wheel assembly support member via a sliding mechanism such that the tire/wheel assembly support member can move in the vertical/substantially vertical direction; and at least one of a spring element and an attenuation element that is arranged between the tire/wheel assembly support member and the vehicle body-side member. The vehicle body-side member is coupled with a vehicle body at least two coupling portions, one of which is arranged on the front side of a wheel center and the other of which is arranged on the rear side of the wheel center, via respective bushings. A moment length of the front bushing with respect to the wheel center is shorter than a moment length of the rear bushing with respect to the wheel center.

According to the first aspect of the invention, it is possible to provide the in-wheel suspension, with which the camber angle can be changed in the optimum manner when the tire/wheel assembly jounces/rebounds.

According to the second aspect of the invention, it is possible to provide the in-wheel suspension, with which the toe angle can be changed in the optimum manner when a braking force is applied.

BRIEF DESCRIPTION OF THE DRAWINGS

The foregoing and further objects, features and advantages of the invention will become apparent from the following description of preferred embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be described in detail with reference to accompanying drawings.

Figure 1:
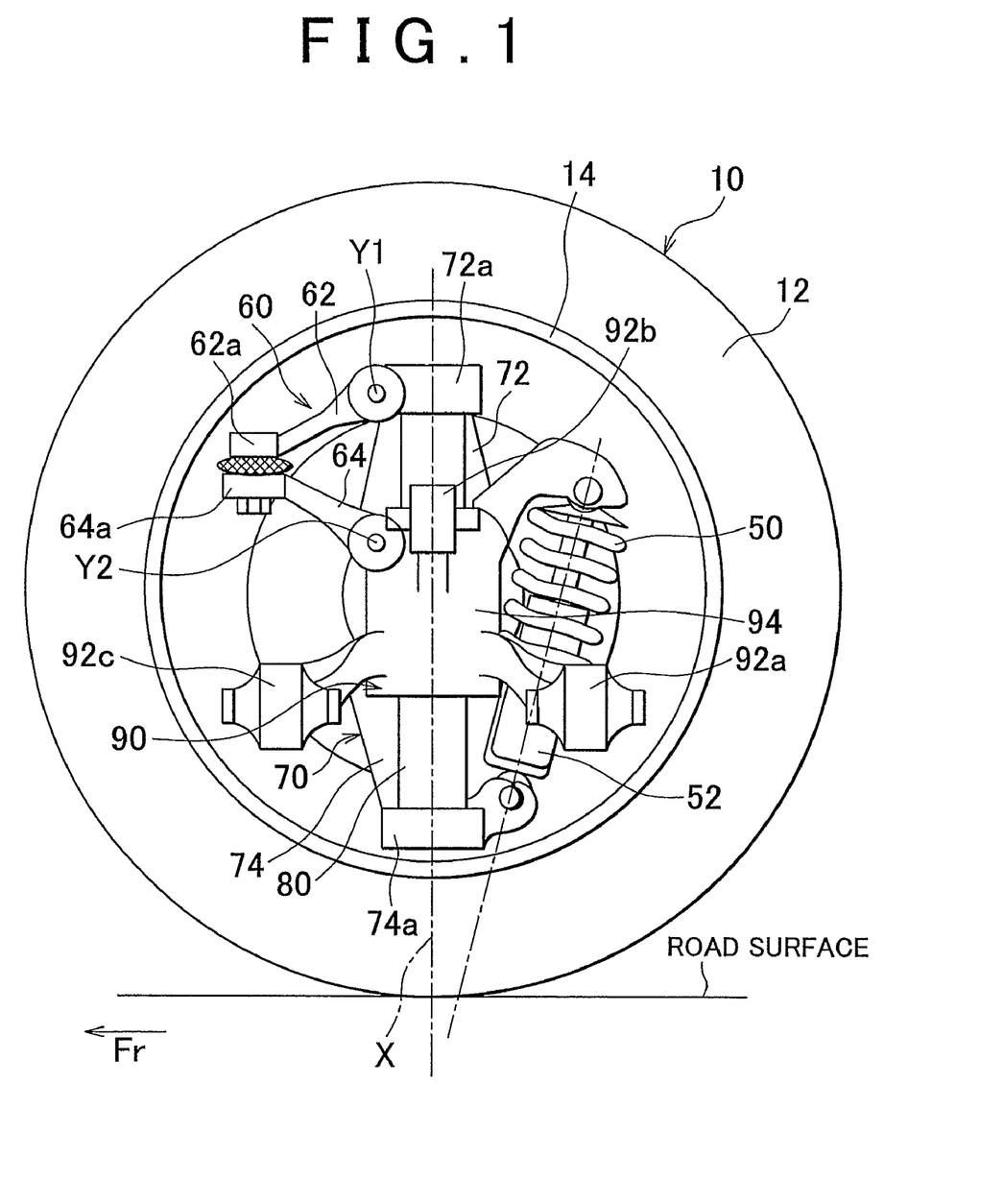
FIG. 1 illustrates the side view showing the basic structure of an in-wheel suspension according to embodiments of the invention.
Figure 2:
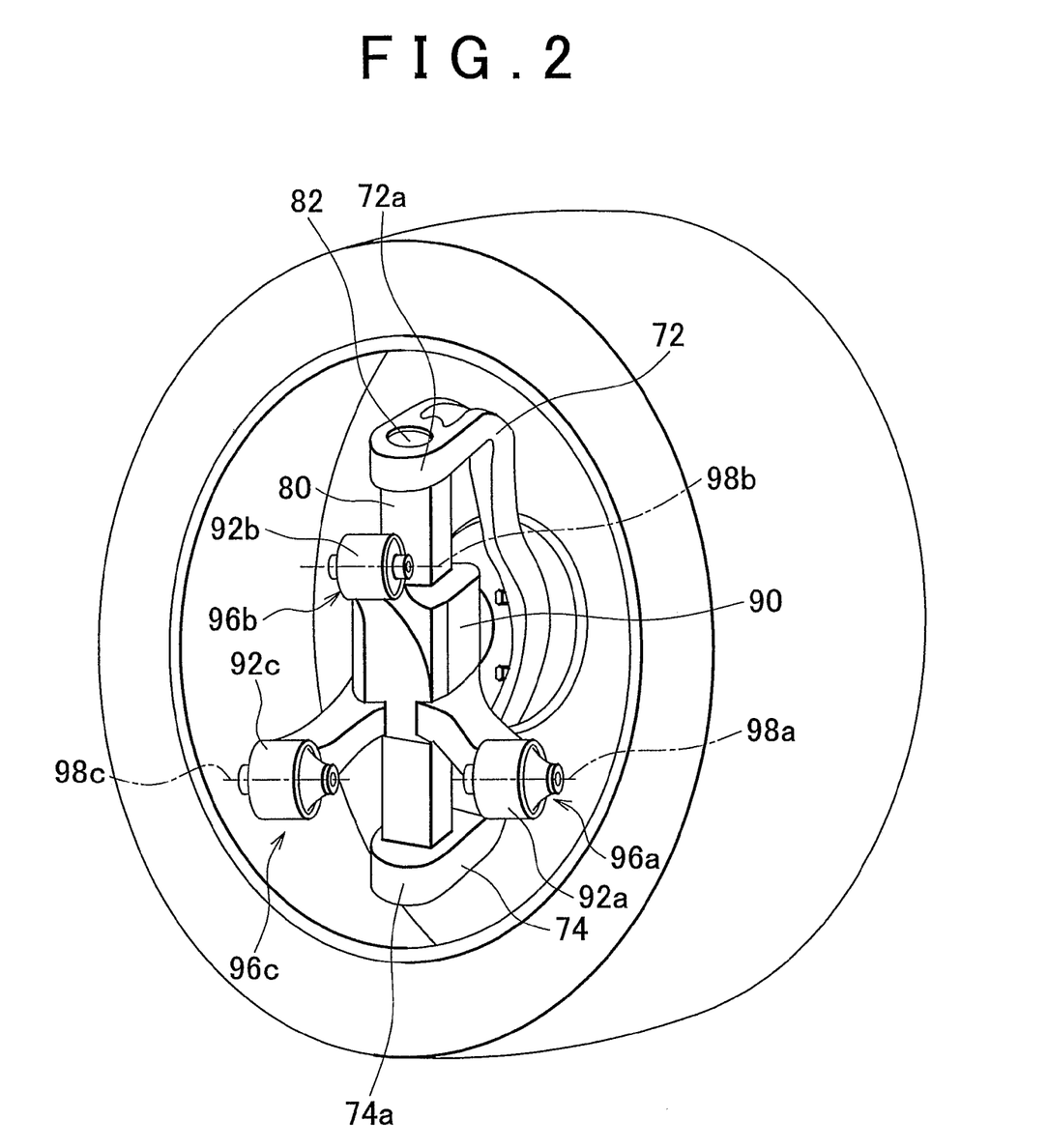
FIG. 2 illustrates the perspective view showing the basic structure of the in-wheel suspension according to the embodiments of the invention.

FIG. 1 illustrates the structure of a main portion of an in-wheel suspension according to the embodiments of the invention. FIG. 1 is the side view of a tire/wheel assembly viewed from the inside of a vehicle. The left side of FIG. 1 is the front of the vehicle. FIG. 2 illustrates the perspective view of the in-wheel suspension in FIG. 1. In FIG. 2, a spring 50 and an absorber 52 are not shown. In the description below, the in-wheel suspension according to each embodiment is applied to a rear wheel. However, the in-wheel suspension according to each embodiment may be applied to a front wheel.

A tire/wheel assembly 10 includes a tire 12 and a wheel 14. As described below in detail, main portions of suspension components are arranged in a space defined by an inner peripheral surface of a rim of the wheel 14. The term "in the wheel" corresponds to the term "in the substantially cylindrical space defined by the inner peripheral surface of the rim of the wheel 14". However, the description that a component is arranged in the wheel does not always mean that the entirety of the component is arranged in the wheel. The description includes the structure where the component partially protrudes from the wheel.

A carrier 70 is arranged in the wheel. The carrier 70 has an axle bearing (not shown) at the wheel center, and rotatably supports the tire/wheel assembly 10. A brake rotor is provided inboard of the carrier 70, and a brake caliper (not shown) is fixed to the carrier 70.

The carrier 70 has two arm portions 72, 74. The arm portion 72 extends upward from the wheel center, and the arm portion 74 extends downward from the wheel center. An end portion 72a of the arm portion 72 and an end portion 74a of the arm portion 74 are arranged inboard of the center portion of the carrier 70. A shaft member 80, which extends in the substantially vertical direction (in the vertical direction, in the embodiments), is provided between the end portions 72a, 74a.

The shaft member 80 rotatably or non-rotatably supports the carrier 70. In the structure where the carrier 70 is rotatably supported, the rotational axis of the carrier 70 may be a central axis X of the shaft member 80, which extends in the substantially vertical direction (in the vertical direction, in the embodiments). More specifically, the end portion 72a of the arm portion 72 of the carrier 70 and the end portion 74a of the arm portion 74 of the carrier 70 are supported by an upper end 82 and a lower end 82 of the shaft member 80, respectively, (only the upper end 82 is shown in FIG. 2) such that the end portions 72a, 74a can rotate on the central axis X. The end portions 72a, 74a may be supported by the upper end 82 and the lower end 82 using, for example, ball joints, rubber bushings, or bearings, respectively.

A vehicle body-side member 90 extends from a vehicle body into the wheel, and supports the tire/wheel assembly 10 such that the tire/wheel assembly 10 can move in the vertical/substantially vertical direction. The vehicle body-side member 90 is provided with coupling portions 92a, 92b, 92c that are fixed to the vehicle body (for example, a suspension member) via bushings 96a, 96b, 96c, respectively. The coupling portions 92a, 92b, 92c are arranged on the vehicle body side. The structure of each bushing at the coupling portion will be described later in detail.

The vehicle body-side member 90 includes a support portion 94 in the wheel. The support portion 94 supports the shaft member 80 such that the shaft member 80 can slide but cannot rotate. More specifically, the shaft member 80 has a rectangular cross section (the cross section may have any shapes other than a circle) that is constant in the axial direction. A sliding groove having a rectangular cross section (the cross section may have any shapes as long as the shaft member 80 can be fitted in the sliding groove) is formed in the support portion 94. The shaft member 80 is supported in the sliding groove formed in the support member 94 such that the shaft member 80 can slide along the central axis X of the shaft member 80 but cannot rotate on the central axis X. Alternatively, the shaft member 80 may be splined to the support portion 94 such that the shaft member 80 can slide but cannot rotate with respect to the vehicle body-side member 90. For example, bearings may be arranged in the sliding groove of the support member 94 in order to suppress friction that occurs during sliding of the shaft member 80.

Thus, the carrier 70 can slide in the vertical/substantially vertical direction along the central axis X. A certain degree of freedom in the vertical/substantially vertical movement of the tire/wheel assembly 10 with respect to the vehicle body is ensured. In the structure in which the carrier 70 is rotatably supported by the shaft member 80, the carrier 70 can not only slide in the vertical/substantially vertical direction along the central axis X of the shaft member 80 but also rotate on the central axis X. Certain degrees of freedom in the vertical/substantially vertical movement and the rotational movement of the tire/wheel assembly 10 with respect to the vehicle body are ensured. In this case, a link (not shown) for restricting the degree of freedom in the rotational movement of the carrier 70 may be arranged between the carrier 70 and the vehicle body-side member 90.

The spring (coil spring) 50 and the absorber 52 are arranged between the vehicle body-side member 90 and the carrier 70 (or the shaft member 80). More specifically, in the wheel, the upper end of the spring 50/absorber 52 (the upper end of a rod) is fitted to the vehicle body-side member 90, and the lower end of the spring 50/absorber 52 (the lower end of a shell) is fitted to the carrier 70. Thus, the load point of the spring 50/absorber 52 is positioned in the wheel. In FIG. 1, the spring 50 is arranged between a lower spring seat and an upper spring seat so as to surround the absorber 52. The spring 50 and the absorber 52 coaxially extend and contract in the vertical/substantially vertical direction. However, the spring 50 and the absorber 52 need not extend and contract coaxially with each other. Also, any one of a spring coil, a leaf spring and an air spring may be used as the spring 50. The absorber 52 may be either a hydraulic absorber that attenuates a shock input in the vertical/substantially vertical direction or a rotary electromagnetic absorber that attenuates a shock input in the rotational direction.

If the tire/wheel assembly 10 moves in the vertical/substantially vertical direction (when the tire/wheel assembly 10 jounces/rebounds), the shaft member 80 slides in the vertical/substantially vertical direction along the axis X in the sliding groove 94*a* of the support portion 94, when relatively viewed from the vehicle body side. The spring 50/absorber 52 extends and contracts in accordance with the sliding of the shaft member 80. As a result, a shock from the road surface is attenuated.

In the description above, the shaft member 80 is supported such that the shaft member 80 cannot rotate with respect to the vehicle body-side member 90. However, the shaft member 80 may be supported such that the shaft member 80 can rotate with respect to the vehicle body-side member 90, for example, by providing the shaft member 80 having a circular cross section. In this case, however, the shaft member 80 may non-rotatably support the carrier 70 (namely, the shaft member 80 and the carrier 70 are formed integrally with each other), and a link (not shown) for restricting the degree of freedom in the rotational movement of the carrier 70 may be arranged between the shaft member 80 or the carrier 70, and the vehicle body-side member 90.

In order to ensure stability of the vehicle, changing the camber angle in accordance with the vertical/substantially vertical movement of the tire/wheel assembly (i.e., as the tire/wheel assembly jounces/rebounds) and changing the orientation of the tire/wheel assembly such that a toe-in-angle increases when a braking force is applied are effective. However, in the in-wheel suspension including a sliding mechanism described above (a mechanism which enables the vehicle body-side member 90 and the shaft member 80 to slide with respect to each other), the degrees of freedom in movements of the tire/wheel assembly other than the vertical/substantially vertical movement and the rotational movement are actually restricted by the sliding mechanism. This makes it difficult to change the camber angle in accordance with the vertical/substantially vertical movement of the tire/wheel assembly (as the tire/wheel assembly jounces/rebounds), and to change the orientation of the tire/wheel assembly such that a toe-in-angle increases when a braking force is applied. Such inconvenience does not occur in a commonly used multi-link suspension without a sliding mechanism.

In order to avoid such inconvenience, the invention is made. A first embodiment of the invention relates to an in-wheel suspension having a sliding mechanism described above, with which the camber angle can be changed in the optimum manner when the tire/wheel assembly moves in the vertical/substantially vertical direction. A second embodiment of the invention relates to an in-wheel suspension having a sliding mechanism described above, with which the toe-angle can be changed in the optimum manner when a braking force is applied. Hereafter, the first and second embodiments will be described in detail.

Figure 3:
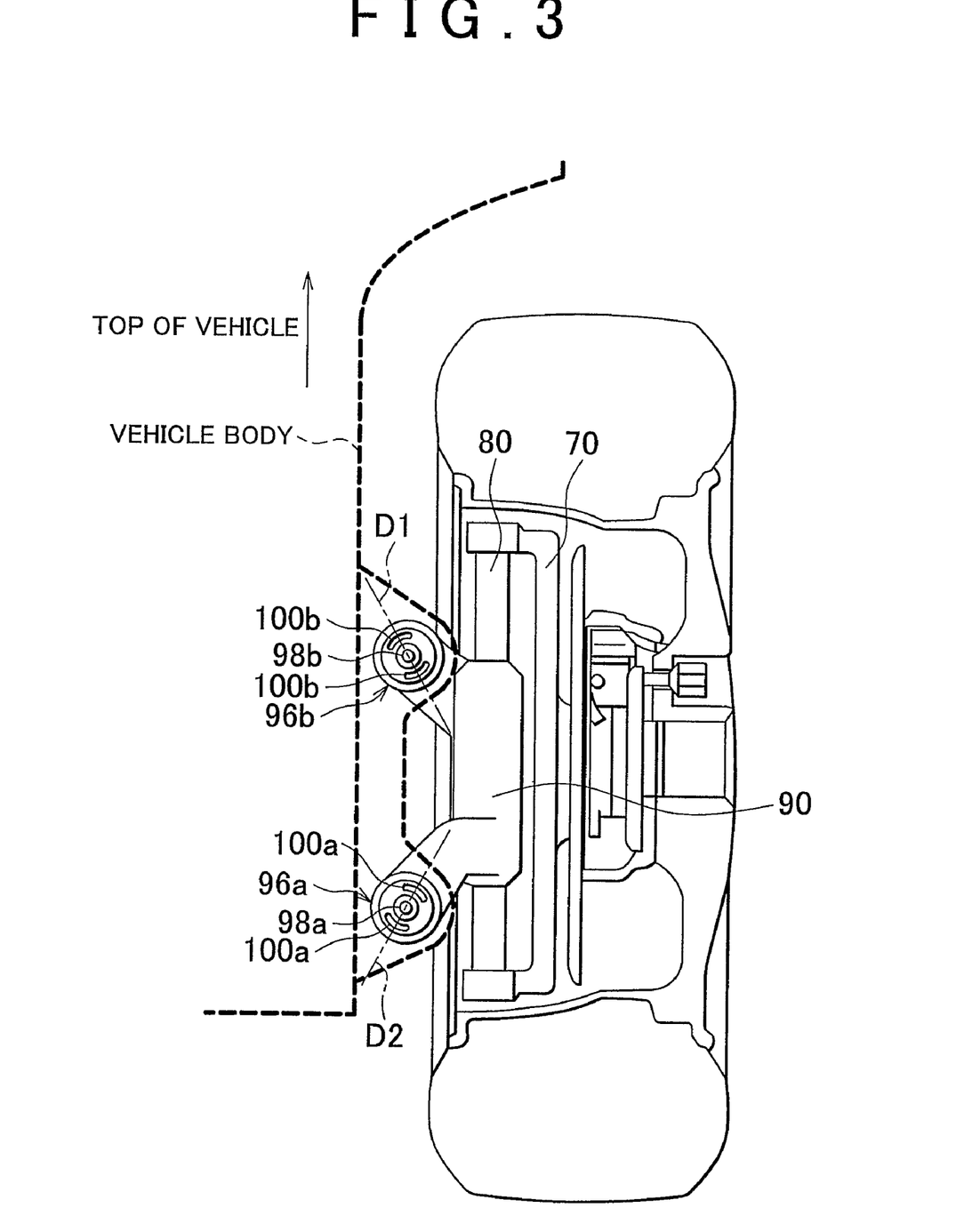
FIG. 3 illustrates the cross-sectional view showing the structure of a main portion of an in-wheel suspension according to a first embodiment of the invention, when viewed from the rear of a vehicle.

FIG. 3 illustrates the cross-sectional view showing the structure of a main portion of the in-wheel suspension according to the first embodiment of the invention, when viewed from the rear of a vehicle.

As described above, in the basic structure shown, for example, in FIG. 1, the vehicle body-side member 90 that slidably supports the tire/wheel assembly 10 is coupled with the vehicle body at the three coupling portions 92*a*, 92*b*, 92*c* via the bushings 96*a*, 96*b*, 96*c*, respectively. The coupling portions 92*a*, 92*c* are arranged below the wheel center, and the coupling portion 92*b* is arranged above the wheel center. Because the structure of the bushing 96*c* arranged at the coupling portion 92*c* may be the same as that of the bushing 96*a*, the structures of the bushings 96*a*, 96*b* will be described below. In the example shown in FIG. 3, a bushing axis 98*a* (the pivot axis of the coupling portion 92*a*) and a bushing axis 98*c* (the pivot axis of the coupling portion 92*c*) are arranged coaxially with each other (in the direction perpendicular to the paper on which FIG. 3 is drawn). However, the bushing axis 98*a* of the coupling portion 92*a* and the bushing axis 98*c* of the coupling portion 92*c* need not be coaxially arranged. In addition, the bushing axis 98*a* and the bushing axis 98*c* need not extend horizontally. In the example shown in FIG. 3, the coupling portions 92*a* and 92*b* are symmetric in the vertical/substantially vertical direction with respect to the wheel center, when viewed from the rear of the vehicle. However, the positional relationship between the coupling portions 92*a*, 92*b* in the invention is not limited to this. Also, in the example shown in FIG. 3, to facilitate the understanding, the pivot axes of the coupling portions 92*a*, 92*b* are in parallel with each other (i.e., the pivot axes of the coupling portions 92*a*, 92*b* extend in the direction perpendicular to the paper on which FIG. 3 is drawn). However, the positional relationship between the pivot axes of the coupling portions 92*a*, 92*b* in the invention is not limited to this.

The bushing 96*a* includes an inner cylinder and an outer cylinder that are arranged coaxially with the bushing axis 98*a*. Similarly, the bushing 96*b* includes an inner cylinder and an outer cylinder that are arranged coaxially with the bushing axis 98*b*. In each of the bushings 96*a* and 96*b*, a rubber member is arranged between the inner cylinder and the outer cylinder. In the example shown in FIG. 3, the inner cylinder is fixed to the vehicle body, and the outer cylinder is fixed to the vehicle body-side member 90.

In the first embodiment, the upper bushing 96b has portions with high rigidity and portions with low rigidity. The portions with low rigidity are formed in a certain direction. The direction in which the portions with low rigidity are formed is set to an oblique direction D1. The line, which extends in the oblique direction D1, tilts with respect to the vehicle body such that the distance between the line and the vehicle body decreases upward and toward the inside of the vehicle. Similarly, the lower bushing 96a has portions with high rigidity and portions with low rigidity. The portions with low rigidity are formed in a certain direction. The direction in which the portions with low rigidity are formed is set to an oblique direction D2. The line, which extends in the oblique direction D2, tilts with respect to the vehicle body such that the distance between the line and the vehicle body decreases downward and toward the inside of the vehicle.

More specifically, as shown in FIG. 3, in the bushing 96b, two bores 100b are formed in the oblique direction D1. Similarly, in the bushing 96a, two bores 100a are formed in the oblique direction D2. In the example in FIG. 3, the lines extending in the oblique directions D1, D2 are accurately perpendicular to the bushing axes 98b, 98a, and pass through the bushing axes 98b, 98a, respectively. However, the invention is not limited to this. Also, each of the lines extending in the oblique directions D1, D2 tilts with respect to the horizontal line by approximately 45 degrees, when viewed from the rear of the vehicle. However, the degree by which each of the lines extending in the oblique directions D1, D2 tilts with respect to the horizontal line in the invention is not limited to this. Also, the number of the bores 100a may be one instead of two. Similarly, the number of the bores 100b may be one instead of two. The portions with low rigidity may be formed by forming slits, filling hollow portions with material having a low degree of elasticity, or making the portions other than the portions formed in the oblique directions D1, D2 relatively rigid, instead of forming the bores 100a, 100b. Namely, any types of structure may be employed as long as the bushings 96b, 96a are deformed more easily by forces applied in the oblique directions D1, D2 than by forces applied in the other directions. Each of the bushings 96a, 96b need not have a cylindrical shape. Each of the bushings 96a, 96b may be a column member having, for example, a square, rectangular, or polygonal cross section.

Figure 4:
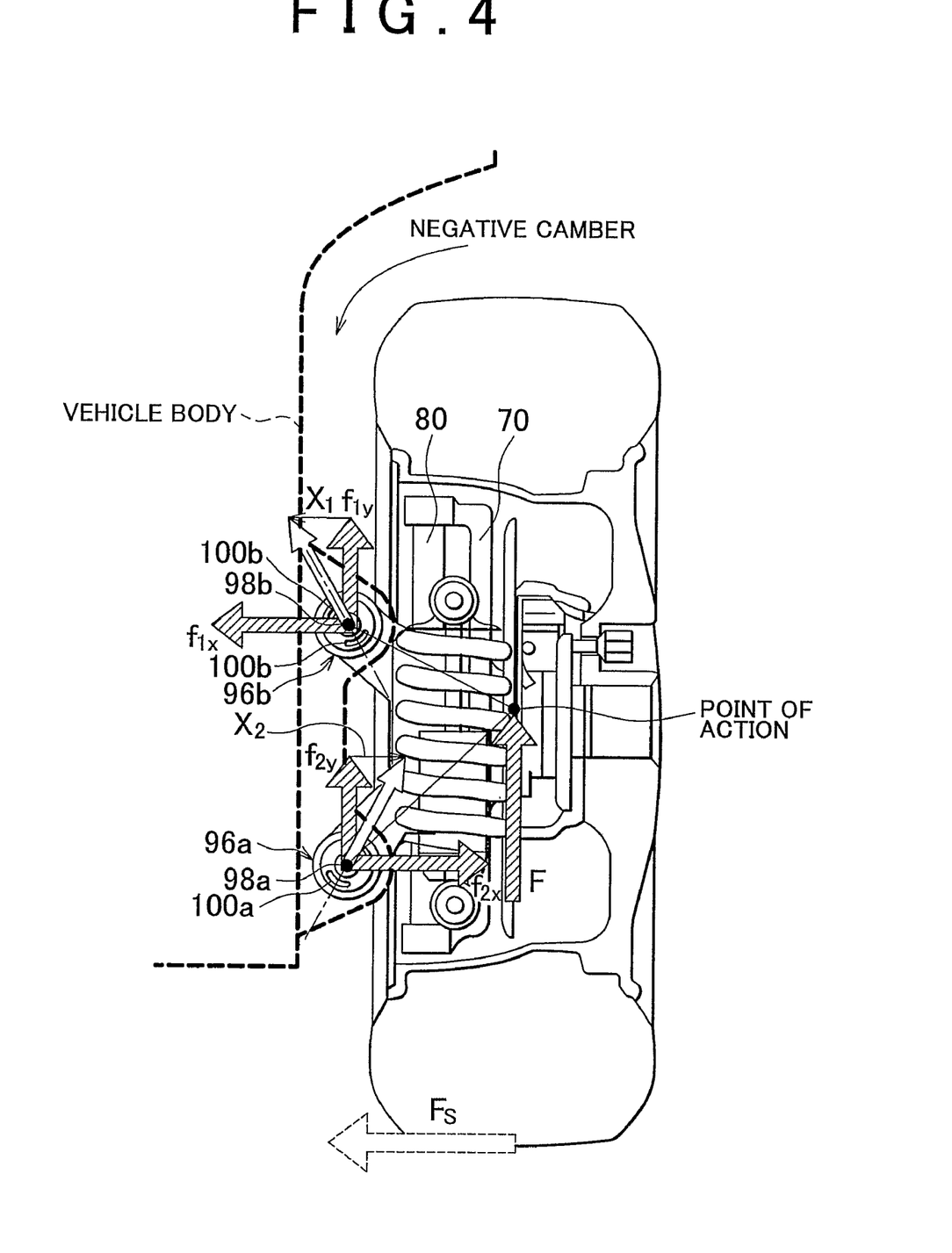
FIG. 4 illustrates the view for describing a manner in which a camber angle is changed with the in-wheel suspension according to the first embodiment.

FIG. 4 illustrates the view for describing a manner in which the camber angle is changed with the in-wheel suspension including the above-described bushings 96a, 96b.

In FIG. 4, a load F is a force for supporting the weight of the vehicle. When the tire/wheel assembly moves upward (ounces), the load F increases based on the spring characteristics of the spring 50. At this time, a force f1x and a force f1y are applied to the bushing 96b to support the vehicle, as shown in FIG. 4. Similarly, a force f2x and a force f2y are applied to the bushing 96a to support the vehicle, as shown in FIG. 4. In the case where each of the bushings 96b, 96a has uniform rigidity, if the load F increases when the tire/wheel assembly jounces as described above, the bushings 96b, 96a are deflected by amounts corresponding to increases in the lateral components f1x, f2x that increase with increases in the load F, respectively. The amount of deflection contributes to the increase in the negative camber angle.

In contrast to this, according to the first embodiment, the amounts of deflections of the bushings 96b, 96a in the oblique directions D1, D2 due to the same load F (f1y, f2y) are great. Accordingly, amounts X1, X2 of displacements of the bushings 96b, 96a in the lateral direction are greater than those when the rigidity of each of the bushings 96b, 96a is uniform. As a result, according to the first embodiment, when the tire/wheel assembly jounces, the upper portion of the tire/wheel assembly 10 with respect to the wheel center is greatly displaced toward the inside of the vehicle, and the lower portion of the tire/wheel assembly 10 with respect to the wheel center is greatly displaced toward the outside of the vehicle, as compared with the case where the rigidity of each of the bushings 96b, 96a is uniform. Accordingly, the negative camber angle can be changed by a greater amount. Thus, even in the structure in which the degrees of freedom in movements of the tire/wheel assembly other than the vertical/substantially vertical movement and the rotational movement are actually restricted, the negative camber angle can be changed by an optimum amount, which improves the stability of the vehicle.

The amount of change in the negative camber angle can be increased by wholly decreasing the degree of elasticity (spring constant) of the bushings 96b, 96a. However, in such a case, because the bushings 96b, 96a are greatly deflected by a tire lateral force Fs, the orientation of the tire/wheel assembly 10 greatly changes such that a negative camber angle increases, which is not desirable with regard to the stability of the vehicle. In contrast, according to the first embodiment, the degree of elasticity (spring constant) is decreased only at the portions of each of the bushings 92b, 96a, which are formed in the oblique directions D1, D2, respectively. Accordingly, the bushings 96b, 96a are not greatly deflected by the tire lateral force Fs. As described so far, according to the first embodiment, the amount of change in the negative camber angle can be increased when a force is applied in the vertical/substantially vertical direction, while the amount of change in the negative camber angle is not increased more than necessary when a force is applied in the lateral direction. Accordingly, the two objects that are incompatible with each other can be both achieved. Seen from this viewpoint, preferably, the rigidity of the bushings 96a, 96b against a force applied in the oblique directions D2, D1 is low, and the rigidity of the bushings 96a, 96b against a force applied in the lateral direction is high.

Figure 5:
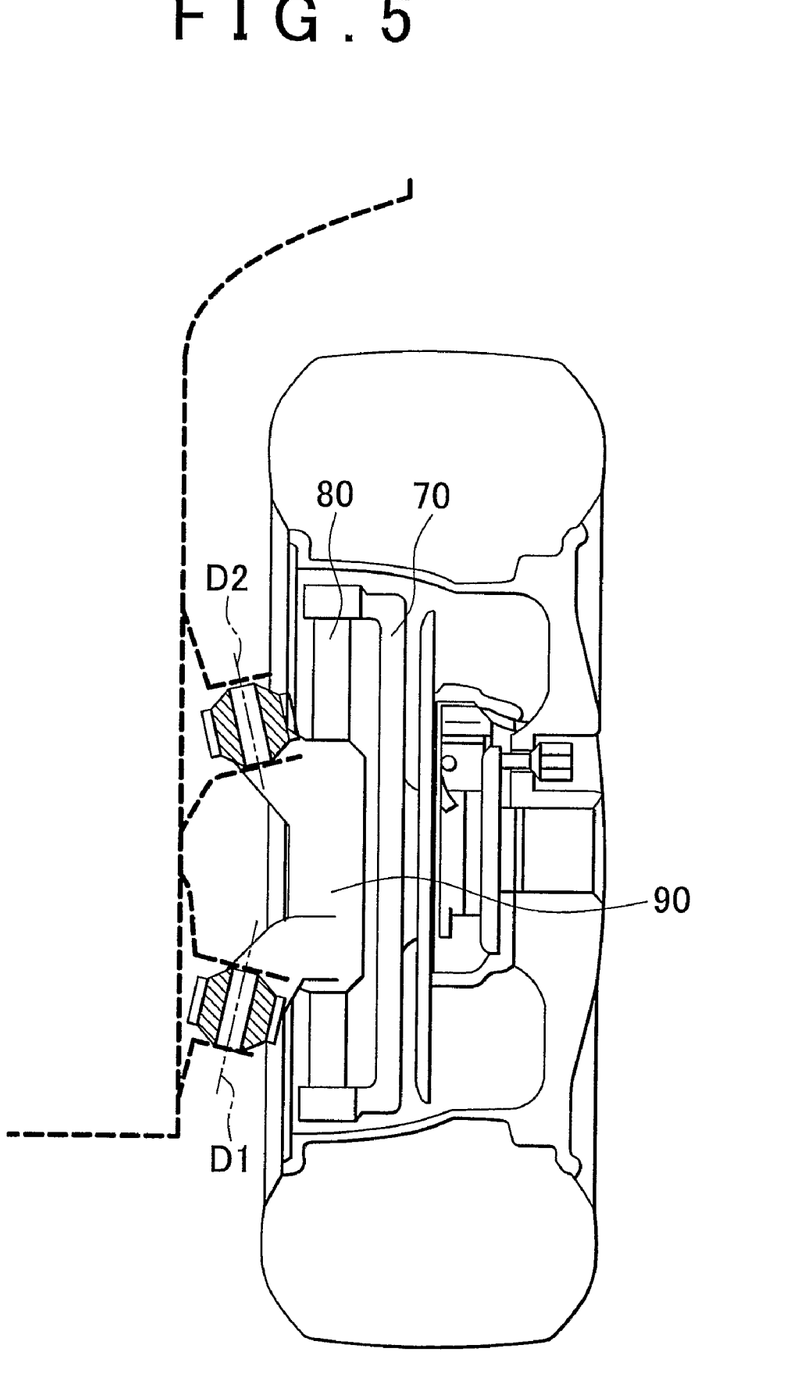
FIG. 5 illustrates the cross-sectional view of a main portion of an in-wheel suspension according to a modified example of the first embodiment, when viewed from the rear of the vehicle.

FIG. 5 illustrates the cross-sectional view of a main portion of an in-wheel suspension according to a modified example of the first embodiment, when viewed from the rear of the vehicle.

In the first embodiment, the bushing axes 98a, 98b are set to extend in the longitudinal direction of the vehicle. In contrast, in the modified example, the bushing axes 98a, 98b are set to extend in the vertical/substantially vertical direction of the vehicle. Generally, a bushing has the following rigidity characteristics; the rigidity of the bushing against a load applied in the direction in which the bushing axis extends (a load applied in the axial direction) is lower than the rigidity of the bushing against a load applied in the direction perpendicular to the bushing axis (a load applied in the radial direction). In the modified example, based on such rigidity characteristics, the bushings 96a, 96b are arranged such that the bushing axes 98a, 98b extend in the oblique directions D2, D1, respectively. Thus, the in-wheel suspension according to the modified example can produce the same effects as those of the in-wheel suspension according to the first embodiment. In the modified example, the bores 100a, 100b need not be formed.

In the embodiment described above (including the modified example), each of both the bushings 96a, 96b has the portions with high rigidity, and the portions with low rigidity which are formed a certain direction. However, the same effects can be produced even when only one of the bushings 96a, 96b has the portions with high rigidity, and the portions with low rigidity which are formed a certain direction.

Figure 6:
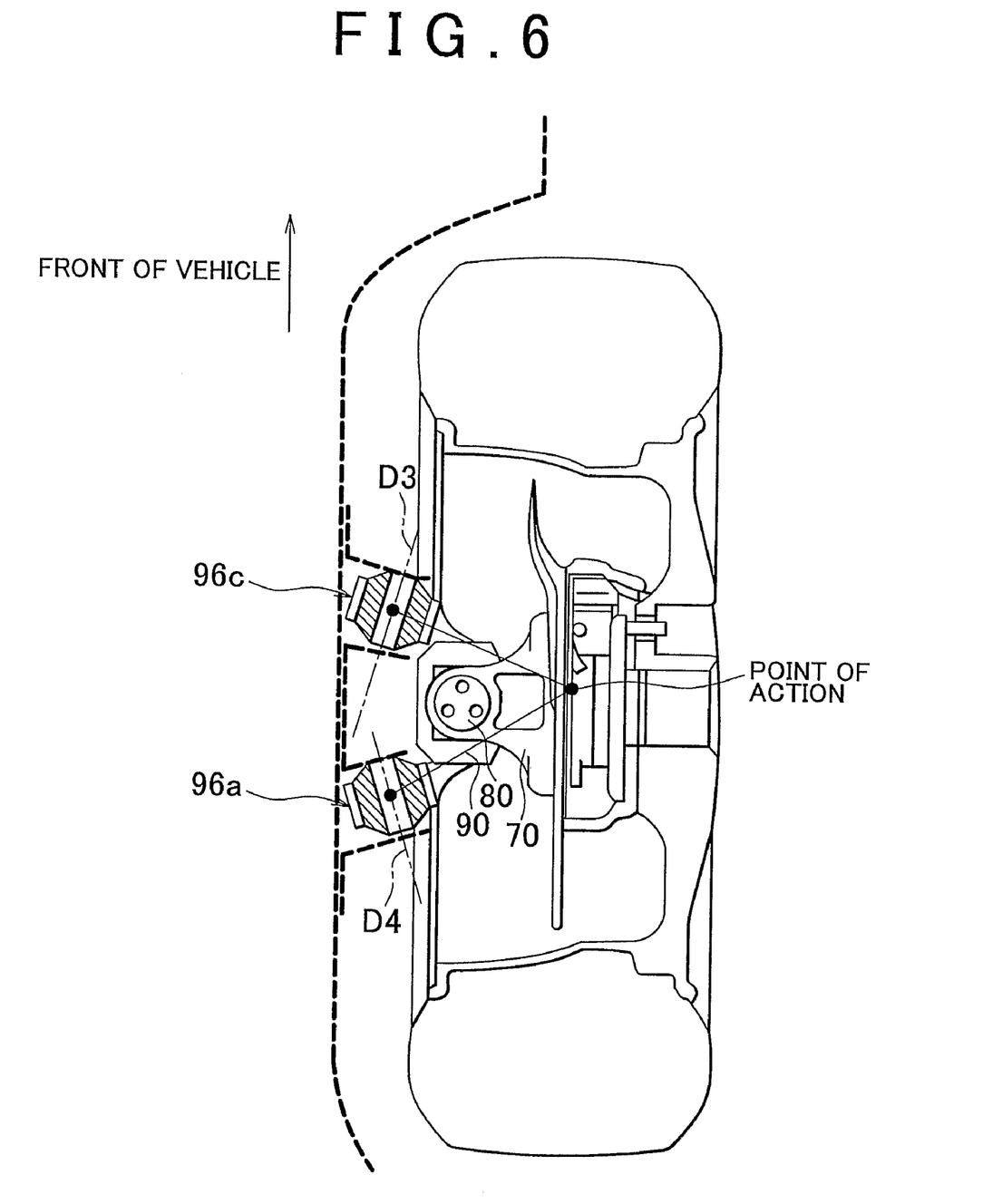
FIG. 6 illustrates the cross-sectional view showing the structure of a main portion of an in-wheel suspension according to a second embodiment of the invention, when viewed from the top of the vehicle.

FIG. 6 illustrates the cross-sectional view showing the structure of a main portion of an in-wheel suspension according to the second embodiment of the invention, when viewed from the top of the vehicle.

As described above, in the basic structure shown, for example, in FIG. 1, the vehicle body-side member 90 that slidably supports the tire/wheel assembly 10 is coupled with the vehicle body at the three coupling portions 92a, 92b, 92c via the bushings 96a, 96b, 96c, respectively. When viewed from the top of the vehicle, the coupling portion 92b is positioned near the wheel center, the coupling portion 92a is arranged on the rear side of the wheel center, and the coupling portion 92c is arranged on the front side of the wheel center. The structure of the bushings 96a, 96c that are arranged in the longitudinal direction of the vehicle and that influence the toe characteristics of the tire/wheel assembly 10 will be described below. In the example shown in FIG. 6, the coupling portions 92a, 92c are symmetric in the longitudinal direction of the vehicle with respect to the wheel center, when viewed from the top of the vehicle. However, the positional relationship between the coupling portions 92a, 92c in the invention is not limited to this.

In the second embodiment, the front bushing 96c has portions with high rigidity, and portions with low rigidity which are formed in a certain direction. The direction in which the portions with low rigidity are formed is set to an oblique direction D3. The line, which extends in the oblique direction D3, tilts with respect to the vehicle body such that the distance between the line and the vehicle body decreases toward the rear of the vehicle, when viewed from the top of the vehicle. Similarly, the rear bushing 96a has portions with high rigidity, and portions with low rigidity which are formed in a certain direction. The direction in which the portions with low rigidity are formed is set to an oblique direction D4. The line, which extends in the oblique direction D4, tilts with respect to the vehicle body such that the distance between the line and the vehicle body increases toward the rear of the vehicle, when viewed from the top of the vehicle.

More specifically, as shown in FIG. 6, the bushings 96a, 96c are arranged such that the bushing axes 98a, 98c extend in the oblique directions D4, D3, respectively, because the following characteristics of a bushing are taken into account. As described above, generally, a bushing has the following rigidity characteristics; the rigidity of the bushing against a load applied in the direction in which the bushing axis extends (a load applied in the axial direction) is lower than the rigidity of the bushing against a load applied in the direction perpendicular to the bushing axis (a load applied in the radial direction).

Figure 7:
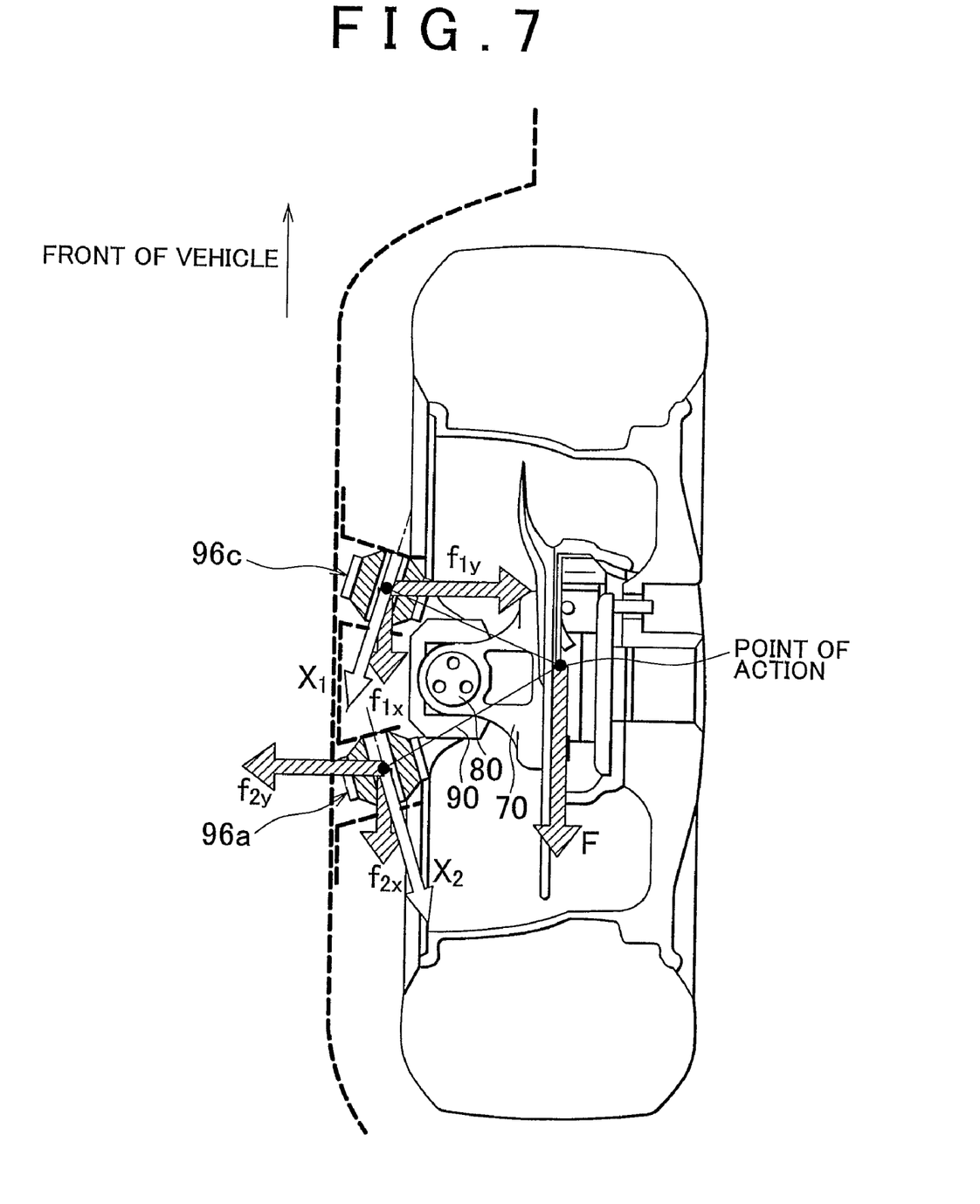
FIG. 7 illustrates the view for describing a manner in which a camber angle is changed with the in-wheel suspension according to the second embodiment.

FIG. 7 illustrates the view for describing a manner in which a camber angle is changed with the in-wheel suspension including the bushings 96a, 96c described above.

In FIG. 7, the load F is a force that acts on the tire/wheel assembly 10 (the point at which the tire/wheel assembly 10 contacts the road surface) when a braking force is applied. As shown in FIG. 7, the forces f1x, f1y are applied to the bushing 96c, and the forces f2x, f2y are applied to the bushing 96a, when a braking force is applied. In the case where the rigidity of each of the bushings 96c, 96a is uniform, the bushings 96c, 96a are simply deflected by the lateral components f1y, f2y of the load F, respectively. As a result, the orientation of the tire/wheel assembly 10 is changed such that the toe-out-angle of the tire/wheel assembly 10 increases.

In contrast to this, according to the second embodiment, the amounts of deflections of the bushings 96c, 96a in the oblique directions D3, D4 due to the same load F (f1x, f2x) are great. Accordingly, amounts X1, X2 of displacements of the bushings 96c, 96a in the lateral direction are greater than those when the rigidity of each of the bushings 96c, 96a is uniform. As a result, according to the second embodiment, when a braking force is applied, the front portion of the tire/wheel assembly 10 with respect of the wheel center is greatly displaced toward the inside of the vehicle, and the rear portion of the tire/wheel assembly 10 with respect to the wheel center is greatly displaced toward the outside of the vehicle, as compared with the case where the rigidity of each of the bushings 96b, 96a is uniform. Accordingly, an amount of change in the toe-out-angle can be reduced.

Also, according to the second embodiment, the orientation of the tire/wheel assembly 10 can be changed such that the toe-in-angle increases by adjusting/setting the rigidity of the portions of the bushings 96c, 96a, which are formed in the oblique directions D3, D4 such that the amounts of deflections in the lateral direction due to the longitudinal components f1x, f2x of the load F are greater than the amounts of deflections in the lateral direction due to the lateral components f1y, f2y, respectively. Thus, even in the structure in which the degrees of freedom in the movements of the tire/wheel assembly other than the vertical/substantially vertical movement and the rotational movement are actually restricted by the sliding mechanism, the toe-angle can be changed by the optimum amount when a braking force is applied. As a result, the stability of the vehicle improves. Seen from this view point, preferably, the rigidity of the bushings 96c, 96a against the force applied in the oblique directions D3, D4 is low, and the rigidity of the bushings 96c, 96a against the force applied in the lateral direction is high.

Figure 8:
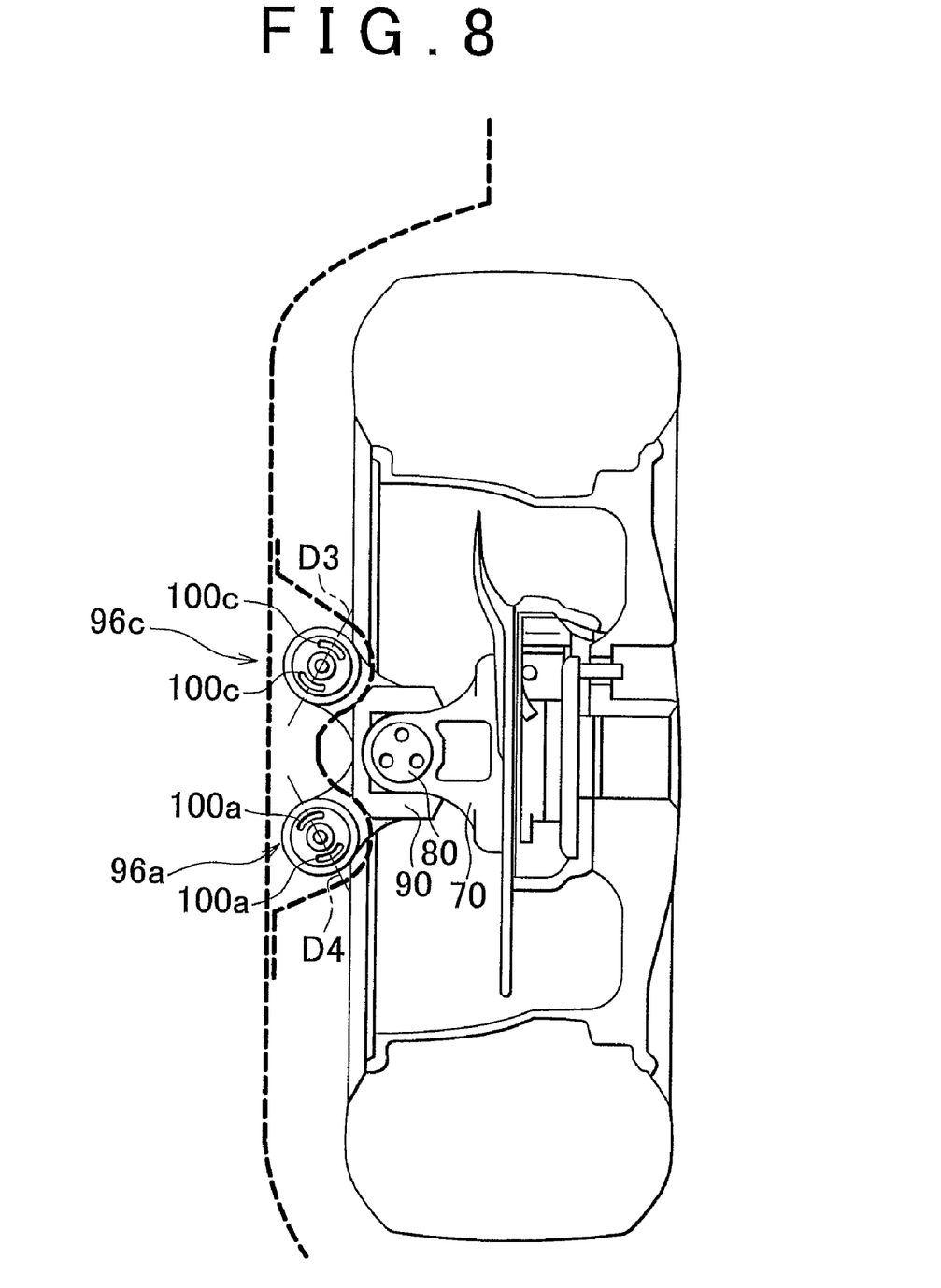
FIG. 8 illustrates the cross-sectional view showing the structure of a main portion of an in-wheel suspension according to a modified example of the second embodiment, when viewed from the top of the vehicle.

FIG. 8 illustrates the cross-sectional view showing the structure of a main portion of an in-wheel suspension according to a modified example of the second embodiment, when viewed from the top of the vehicle.

In the second embodiment, the bushing axis 98a of the bushing 96a and the bushing axis 98c of the bushing 96c are set to extend in the longitudinal direction of the vehicle. In contrast, in the modified example, the bushing axes 98a, 98c are set to extend in the vertical/substantially vertical direction of the vehicle. In the modified example as well, the front bushing 96c has the portions with high rigidity, and the portions with low rigidity which are formed in a certain direction. The direction in which the portions with low rigidity are formed is set to the oblique direction D3. The line, which extends in the oblique direction D3, tilts with respect to the vehicle body such that the distance between the line and the vehicle body decreases toward the rear of the vehicle, when viewed from the top of the vehicle. Similarly, the rear bushing 96a has the portions with high rigidity, and the portions with low rigidity which are formed in a certain direction. The direction in which the portions with low rigidity are formed is set to the oblique direction D4. The line, which extends in the oblique direction D4, tilts with respect to the vehicle body such that the distance between the line and the vehicle body increases toward the rear of the vehicle, when viewed from the top of the vehicle.

More specifically, in the bushing 96c, two bores 100c are formed in the oblique direction D3. Similarly, in the bushing 96a, the two bores 100a are formed in the oblique direction D4. Thus, the in-wheel suspension according to the modified example can produce the same effects as those of the in-wheel suspension according to the second embodiment.

In the example shown in FIG. 8, the lines extending in the oblique directions D3, D4 are accurately perpendicular to the bushing axes 98c, 98a, and pass through the bushing axes 98c, 98a, respectively. However, the invention is not limited to this. Also, each of the lines extending in the oblique directions D3, D4 tilts with respect to the vehicle body by approximately 45 degrees, when viewed from the top of the vehicle. However, the degree by which each of the lines extending in the oblique directions D1, D2 tilts with respect to the vehicle body in the invention is not limited to this. Also, the number of the bores 100a may be one instead of two. Similarly, the number of the bores 100c may be one instead of two. The portions with low rigidity may be formed by forming slits, filling hollow portions with material having a low degree of elasticity, or making the portions other than the portions formed in the oblique directions D3, D4 relatively rigid, instead of forming the bores 100a, 100c. Each of the bushings 96a, 96c need not have a cylindrical shape. Each of the bushings 96a, 96c may be a column member having, for example, a square, rectangular, or polygonal cross section.

In the embodiments described above (including modified examples), each of both the front bushing 96c and the rear bushing 96a has the portions with high rigidity, and the portions with low rigidity which are formed a certain direction. However, the same effects can be produced even when only one of the bushings 96c, 96a has the portions with high rigidity, and the portions with low rigidity which are formed a certain direction.

Figure 9:
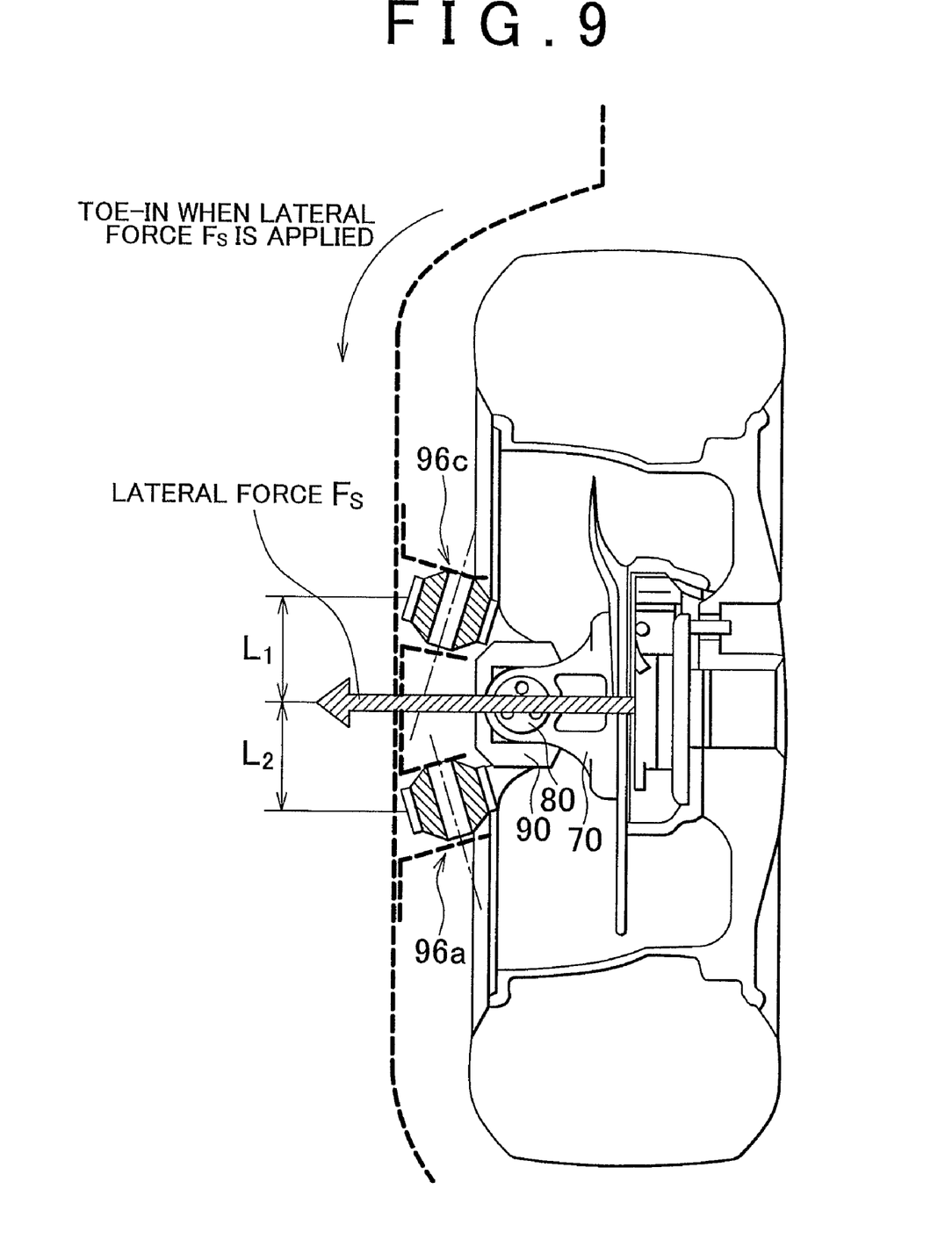
FIG. 9 illustrates the cross-sectional view showing the structure of a main portion of an in-wheel suspension, which can be applied to each of the first and second embodiments, when viewed from the top of the vehicle.

FIG. 9 illustrates the cross-sectional view showing the structure of a main portion of an in-wheel suspension, which can be applied to each of the first and second embodiments, when viewed from the top of the vehicle.

As shown in FIG. 9, the orientation of the tire/wheel assembly 10 may be changed such that the toe-in-angle of the tire/wheel assembly 10 increases when the lateral force Fs is applied, by setting the spring constant of the front bushing 96c to a value less than the spring constant of the rear bushing 96a (namely, making the front bushing 96c more rigid than the rear bushing 96a). In the same viewpoint, the orientation of the tire/wheel assembly 10 may be changed such that the toe-in-angle of the tire/wheel assembly 10 increases when the lateral force Fs is applied, by setting a length L1 (moment length) of the front bushing 96c with respect to the wheel center shorter than a length L2 (moment length) of the rear bushing 96a with respect the wheel center.

The embodiments of the invention that have been described in the specification are to be considered in all respects as illustrative and not restrictive. All changes which come within the meaning and range of equivalency of the claims are therefore intended to be embraced therein.

The invention claimed is:

1. An in-wheel suspension, comprising:
   a tire/wheel assembly support member that supports a tire/wheel assembly;
   a vehicle body-side member that supports the tire/wheel assembly support member via a sliding mechanism such that the tire/wheel assembly support member can move in a substantially vertical direction; and
   at least one of a spring element and an attenuation element that is arranged between the tire/wheel assembly support member and the vehicle body-side member, wherein
   the vehicle body-side member is coupled with a vehicle body at least two coupling portions, one of which is positioned above a wheel center and the other of which is positioned below the wheel center, via respective elastic members, and
   at least one of a structure (a) and a structure (b) is provided, wherein
   (a) the elastic member arranged at the upper coupling portion has portions with high rigidity, and portions with low rigidity formed in an oblique direction that extend upward and toward an inside of a vehicle from a position outside of the vehicle; and (b) the elastic member arranged at the lower coupling portion has portions with high rigidity, and portions with low rigidity formed in an oblique direction that extend downward and toward the inside of the vehicle from a position outside of the vehicle.

2. The in-wheel suspension according to claim 1, wherein
   the elastic member arranged at the upper coupling portion is a bushing, and the portions with low rigidity are formed in a direction in which an axis of the bushing extends; and
   the elastic member arranged at the lower coupling portion is a bushing, and the portions with low rigidity are formed in a direction in which an axis of the bushing extends.

3. An in-wheel suspension comprising:
   a tire/wheel assembly support member that supports a tire/wheel assembly;
   a vehicle body-side member that support the tire/wheel assembly support member via a sliding mechanism such that the tire/wheel assembly support member can move in a substantially vertical direction;
   at least one of a spring element and an attenuation element that is arranged between the tire/wheel assembly support member and the vehicle body-side member;
   a first elastic member which is used for coupling the vehicle body-side member with a vehicle body; and
   a second elastic member which is used for coupling the vehicle body-side member with the vehicle body, and whose moment length is longer than a moment length of the first elastic member.

\* \* \* \* \*